United States Patent Office 3,295,922
Patented Jan. 3, 1967

3,295,922
PROCESS FOR RECOVERING ALUMINUM HA-
LIDES AND HYDROGEN HALIDES FROM
TERNARY ADDITION PRODUCTS HAVING
THE FORMULA: AROMATIC:HX:AlX$_3$ OR
2AlX$_3$ WHERE X IS CHLORINE OR BROMINE
David G. Walker, Baytown, Tex., assignor, by mesne assignments, to Esso Research and Engineering Company, Elizabeth, N.J., a corporation of Delaware
No Drawing. Filed Sept. 9, 1963, Ser. No. 307,326
14 Claims. (Cl. 23—96)

The present invention is directed to a method for recovering aluminum halides from stable ternary addition compounds. More particularly, the invention is concerned with a salt sweep process for recovering aluminum halides from ternary addition compounds of the following formulae: aromatic:HX:AlX$_3$ and aromatic:HX:2AlX$_3$, where X is either chlorine or bromine. In its more specific aspects the invention is concerned with recovering aluminum halides by a salt sweep process which comprises mixing ternary addition compounds of an aromatic, hydrogen halide and aluminum halide with certain metal halides.

The present invention may be briefly described as a salt sweep process for recovering substantially quantitatively aluminum halides and hydrogen halides from ternary addition compounds having the formulae: aromatic:HX:AlX$_3$ and aromatic:HX:2AlX$_3$, where X is either chlorine or bromine by mixing with a metal halide wherein the metal of the metal halide is selected from Na$^{+1}$, K$^{+1}$, Ca$^{+2}$, Mg$^{+2}$, Cu$^{+1}$, Ag$^{+1}$, Sn$^{+2}$, Pb$^{+2}$ and the halide again is selected from either chlorine or bromine.

Stable ternary addition compounds have been known to form when an aromatic is mixed with a hydrogen halide and aluminum halide. These stable compounds are considered to be protonated complexes which may be characterized as follows: (aromatic:H)$^+$ (AlX$_4$)$^-$ or (aromatic:H)$^+$ (Al$_2$X$_7$)$^-$. Throughout the specification X will be used to mean a halogen selected from the group consisting of chlorine and bromine. The stable protonated complexes of aromatics, hydrogen halide and aluminum halide have been isolated, and some study has been directed to using the complexing for separation of aromatics. However, no commercial use of the protonated complexes has been made in that heretofore it has been impossible to recover the aluminum halide in an anhydrous form. The only way known to the art to break the stable protonated complexes was by hydrolysis wherein the aromatic was recovered in an oil phase while the hydrogen halide and aluminum halide came out in an aqueous phase. Once the aluminum halide goes into an aqueous phase, it is impossible practically to again place it in anhydrous form necessary to recycle or for its further use. Accordingly, in the separation between aromatics the use of hydrogen halide and aluminum halide was accompanied by the loss of one mol of aluminum halide per mol of aromatics recovered.

Other attempts have been made to recover the hydrogen halide and aluminum halide from the ternary addition compounds but without success. If the protonated complex is heated, isomerization and disproportionation along with other side reactions take place. An attempt to recover quantitatively the aromatic, hydrogen halide and aluminum halide by heating is illustrated by the following.

A synthesized pure compound of hexamethylbenzene: HBr:2AlBr$_3$ was prepared. The pure compound may also be considered as (hexamethylbenzene-H)$^+$ (Al$_2$Br$_7$)$^-$. The compound was heated in a vacuum system so that any HBr or other volatile materials could be trapped out and identified. The compound was heated for about 1½ hours at 150° C. and then for another 1.8 hours at 170° C., which resulted in the giving off of a volatile gas which was 56% of the theoretical volume of the amount of HBr present in the original compound. The compound was further heated in a vacuum for another 8 to 10 hours at temperatures running as high as 195° C. At that time, the total amount of volatile gas given off was equivalent to 100% of the theoretical amount of hydrogen bromide present in the pure compound. Analysis of the gas, however, showed that it was only about 60% hydrogen bromide while the remaining 40% was principally methyl bromide with traces of isobutane and other organic compounds. During the experiment, some 40% of the original organic material volatilized which was principally hexamethylbenzene with some pentamethylbenzene. The remaining 60% which had not volatilized was a black solid tar. Analysis (mass spectra) indicated that this tar contained a mixture of many organic compounds of molecular weights up to 500. The tar also contained large amounts of pentamethylbenzene and some hexamethylbenzene. From the foregoing, it is clear that the compound, hexamethylbenzene:HBr:2AlBr$_3$, is reasonably stable up to temperatures as high as 150° C.

The foregoing experiment showed that the separation of hexamethylbenzene:HX:Al$_2$X$_6$ by thermal heating in a vacuum cannot be accomplished in a manner to quantitatively recover the desired aluminum halides. Furthermore, in heating the compound under vacuum, considerable side reactions occur. The hexamethylbenzene ternary addition compound was selected to illustrate the stability of the aromatic ternary compounds because any other aromatic would show considerably more isomerization and disproportionation side reactions since the hexamethylbenzene is completely alkylated. Hence, it is considered that the most conclusive results as to the thermal stability of the aromatic ternary compounds are given with the ternary addition compound of the hexamethylbenzene.

According to the present invention, aromatic ternary addition compounds are easily broken by a salt sweep process to recover the hydrogen halide, aluminum halide and the aromatic compound. It is to be noted that the present invention is applicable to both the (AlX$_4$)$^-$ and (Al$_2$X$_7$)$^-$ anions with the protonated aromatics. In some instances the following reaction is applicable:

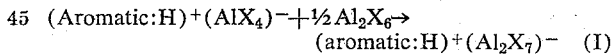

(Aromatic:H)$^+$(AlX$_4$)$^-$+½Al$_2$X$_6$→
(aromatic:H)$^+$(Al$_2$X$_7$)$^-$   (I)

Thus, with some aromatics an equilibrium exists and, accordingly, the two protonated complexes of the aromatic are present. With some aromatics there is a tendency only to form the protonated complex with the (AlX$_4$)$^-$ anion when aromatic and HX are in excess. These aromatics are referred to as the more basic aromatics. By "basic" is meant the tendency of the aromatic to become protonated. The less basic aromatics tend to form with the (Al$_2$X$_7$)$^-$ anion even when aromatic and HX are in excess. However, it is to be noted that the salt sweep process of the present invention accomplishes the reverse of the reaction shown above (I). Accordingly, in the recovery of anhydrous aluminum halides from protonated aromatics having the (Al$_2$X$_7$)$^-$ anion, it is considered that the protonated form having the (AlX$_4$)$^-$ anion will be formed. Thus, the recovery of the anhydrous aluminum halide from a complex of the nature (aromatic:H)$^+$(Al$_2$X$_7$)$^-$ proves the operability with the same aromatic in the protonated complex form (aromatic:H)$^+$(AlX$_4$)$^-$.

According to the present invention, the protonated complexes or ternary addition compounds are admixed with a metal halide. Two groups of metal halides are suitable in the present invention. The first group comprises metal halides which when admixed with the ternary addition compounds forms binary compounds between the metal halide and the aluminum halide. Such metal halides are the sodium, potassium, calcium and magnesium chlorides or bromides. The following reaction illustrates the first group of metal halides:

Hexamethylbenzene:HBr:2AlBr$_3$+2NaBr→

HBr↑+2Na(AlBr$_4$)+hexamethylbenzene

The second group of metal halides, when admixed with the aromatic ternary addition compounds of the aromatic, hydrogen halide and aluminum halide, forms ternary compounds of the metal halide, aluminum halide and aromatic compound, giving off the hydrogen halide. The metal halides of the second group have the metals of the metal halides selected from $Cu^{+1}$, $Ag^{+1}$, $Sn^{+2}$, and $Pb^{+2}$ and the halide selected from either chlorine or bromine. The admixture of the metal halides of the second group with the aromatic ternary addition compounds or protonated complexes may be illustrated by the following reaction:

Hexamethylbenzene:HBr:AlBr$_3$+CuBr→

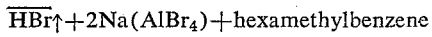
HBr↑+Cu(aromatic)(AlBr$_4$).

In the practice of the present invention, the ternary addition compounds of an aromatic hydrogen halide and aluminum halide are admixed with a metal halide, as above illustrated, at a temperature between about 0° to about 50° C. in an aromatic solvent. Preferably, the temperature is maintained between about 20° to about 35° C. Higher temperatures may be used and the reaction may proceed at a more rapid rate; however, side reactions are more likely since aluminum halides, especially in the form of the $(Al_2X_7)^-$ anion or as free aluminum halide, are well-known Friedel-Crafts catalysts. The aromatic solvent may be illustrated by benzene or toluene but any aromatic which may be easily separated from the aromatic to be recovered may be used. An excess of the aromatic solvent is used, and it is preferred that about 5 to 7 mols of the aromatic solvent are used per mole of the aromatic to be recovered.

The present invention is illustrated by the following examples which are set forth to illustrate the practice of the invention, but are not to be construed as limiting the same.

EXAMPLE 1

6.93 mmol of mesitylene:HCl:2AlCl$_3$ was combined with 19.2 mmol of sodium chloride and 28 mmol of toluene. The mixture was sealed off in an evacuated tube large enough to hold any evolved HCl. The tube was left shaking overnight on an automatic shaker at 25° C. The next morning the tube was attached to a chemical vacuum unit and all volatile matter was distilled off, trapped, measured, and analyzed. Essentially quantitative yields of HCl gas, mesitylene and Na(AlCl$_4$) were obtained. The C$_9$ aromatic fraction gave the following analysis:

| | Mol Percent |
|---|---|
| Mesitylene | 95.3 |
| Pseudocumene | 4.2 |
| Hemimellitine | 0.5 |

EXAMPLE 2

2.83 g. of mesitylene:HCl:2AlCl$_3$ were combined in an identical manner as in Example 1 with 1.72 g. of anhydrous MgCl$_2$ and 4.36 g. of toluene. An essentially quantitative yield of mesitylene (0.79 g.) and HCl (0.24 g.) were recovered.

EXAMPLE 3

A sample of mesitylene:HCl:2AlCl$_3$ was reacted with hexamethylbenzene in stoichiometric amount at 25° C. The sample was volatilized under vacuum and an 86.4% yield of mesitylene was removed. A 10% molar excess of PbCl$_2$ was then added and the sample stirred with heating and vacuum for 3 hours at temperatures up to 150° C. During this period, 13% more mesitylene was volatilized as well as a 99.3% yield of HCl. The residual Pb(hexamethylbenzene)(AlCl)$_2$ was extracted three times with toluene, but only traces of any hexamethylbenzene were extracted.

EXAMPLE 4

6.2 mmol mesitylene:HCl:2AlCl$_3$, 26.2 mmol toluene and 10 mmol of PbCl$_2$ were combined and treated exactly as described in Example 1. The sample was attached to the chemical vacuum unit and heated under vacuum for 1 hour at 15° C. to volatilize 6.5 mmol of HCl (105% theory) and 0.67 g. of hydrocarbon, 9.3% theoretical yield of non-toluene hydrocarbon. This hydrocarbon analyzed 82.8% mesitylene, 16.7% pseudocumene, and 0.8% hemimellitine.

EXAMPLE 5

SnCl$_2$ and mesitylene:HCl:2AlCl$_3$ were stirred together in vacuum at 25° C. in equimolar amounts for 4.8 hours. At the end of this period, analysis showed that 99.3% of the theoretical amount of HCl had been evolved while only 12.1% of the mesitylene content had volatilized.

It is to be pointed out with regard to the above examples that the mesitylene:HCl:2AlCl$_3$ protonated complex and the hexamethylbenzene:HCl:2AlCl$_3$ protonated complex are considered merely exemplary. However, it is again pointed out that the protonated complexes represented as $(Aromatic:H)^+(Al_2X_7)^-$ when reacted with the metal halides are considered to go through the intermediate $(Aromatic:H^+(AlX_4)^-$. Since both mesitylene and hexamethylbenzene are both very basic aromatic compounds, the intermediates when formed in the salt sweep recovery are representative of the most stable and difficult protonated complexes to break. Hence, while other aromatic ternary addition compounds of aromatics, hydrogen halide, and aluminum halide have been quantitatively broken by the salt sweep of the present invention, the examples depict the more difficult protonated complexes being effectively broken quantitatively.

The effect of various metal halides was determined by preparing binary addition compounds of the metal halides with aluminum halide. The binary addition compounds, $M^n(AlX_4)_n$ where $n$ is the valence of the metal and X is selected from Cl and Br, were shaken with various warmed aromatic solutions. When the metal (M) was selected from $Na^{+1}$, $K^{+1}$, $Ca^{+2}$ and $Mg^{+2}$ and the metal halide mixed with aromatic followed by vacuum distillation, it was proved that no stable complexing occurred. Using the same technique with $Sn^{+2}$, $Pb^{+2}$, $Cu^{+1}$ and $Ag^{+1}$, stable ternary complexes with the aromatic compounds formed. When these compounds are heated under vacuum to temperatures as high as 200° C., however, the complexed aromatic is quantitatively volatilized in reasonable times. Other metal halides showed considerable catalytic activity such that the aromatic cannot be recovered quantitatively.

The nature and objects of the present invention having been completely described and illustrated and the best mode set forth, what I wish to claim as new and useful and secure by Letters Patent is:

1. A method for treating a protonated compound selected from the group consisting of aromatic:HX:AlX$_3$ and aromatic:HX:2AlX$_3$ where X is selected from the group consisting of Cl and Br which comprises mixing said compound with a metal halide wherein the metal of said metal halide is selected from the group consisting of $Na^{+1}$, $K^{+1}$, $Ca^{+2}$ and $Mg^{+2}$ and the halide is selected from the group consisting of Cl and Br at a temperature within the range of about 0° to about 50° C. in an aromatic solvent whereby said aromatic and hydrogen halide of said compound are recoverable in substantially quantitative yields and a binary compound of said admixed metal halide and said aluminum halide of said compound is formed.

2. A method in accordance with claim 1 wherein said temperature is within the range of about 20° to about 35° C.

3. A method in accordance with claim 2 wherein said metal halide is NaCl.

4. A method in accordance with claim 2 wherein said metal halide is NaBr.

5. A method in accordance with claim 2 wherein said metal halide is $MgCl_2$.

6. A method in accordance with claim 3 wherein the aromatic solvent is selected from the group of benzene and toluene.

7. A method in accordance with claim 1 wherein the binary metal halide:aluminum halide compound formed is heated to recover the aluminum halide in anhydrous form.

8. A method for treating a protonated compound selected from the group consisting of aromatic:$HX$:$AlX_3$ and aromatic:$HX$:$2AlX_3$ where X is selected from the group consisting of Cl and Br which comprises mixing said compound with a metal halide wherein the metal of said metal halide is selected from the group consisting of $Ag^{+1}$, $Cu^{+1}$, $Sn^{+2}$ and $Pb^{+2}$ and the halide is selected from the group consisting of Cl and Br at a temperature within the range of about 0° to about 50° C. in an aromatic solvent whereby a hydrogen halide and a ternary addition compound of said aromatic, metal halide and aluminum halide are formed.

9. A method in accordance with claim 8 wherein said temperature of mixing is within the range of about 20° to about 35° C.

10. A method in accordance with claim 9 wherein said metal halide is $PbCl_2$.

11. A method in accordance with claim 9 wherein said metal halide is $SnCl_2$.

12. A method in accordance with claim 8 wherein said ternary addition compound is continually heated until the anhydrous aluminum halide is recovered.

13. A method in accordance with claim 8 wherein said ternary addition compound of said aromatic, metal halide, and aluminum halide is heated to recover said aromatic and forming a binary compound of said metal halide and said aluminum halide.

14. A method in accordance with claim 13 wherein the binary metal halide:aluminum halide compound is heated to recover the aluminum halide in anhydrous form.

References Cited by the Examiner
UNITED STATES PATENTS
2,483,487   10/1949   Carney _____ 23—96

MILTON WEISSMAN, *Primary Examiner.*

OSCAR R. VERTIZ, E. STERN, *Assistant Examiners.*